Patented Sept. 22, 1936

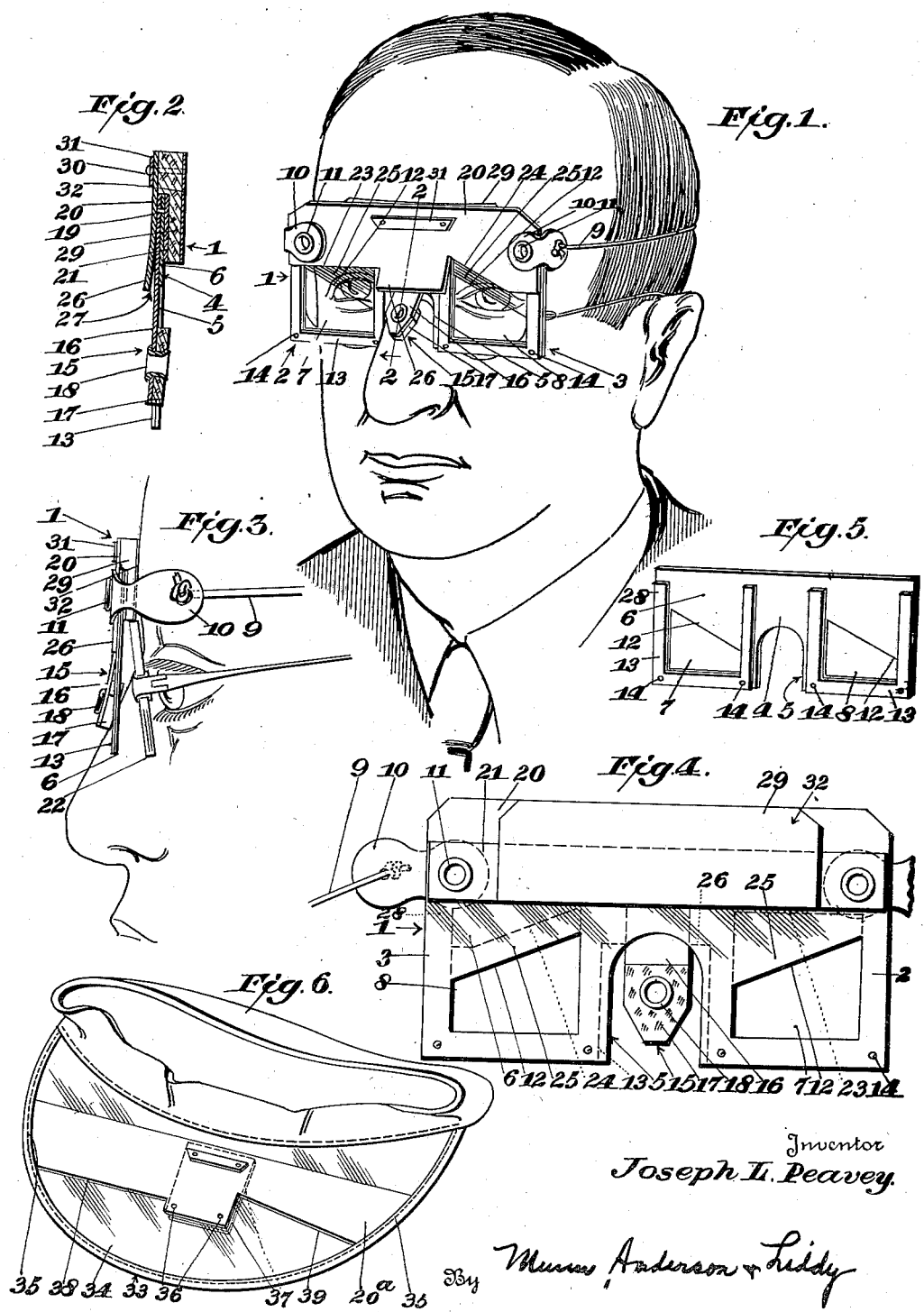

2,055,386

UNITED STATES PATENT OFFICE 2,055,386

GLARE SHIELD

Joseph L. Peavey, Meridian, Miss.

Application December 29, 1934, Serial No. 759,775

6 Claims. (Cl. 2—12)

This invention relates to improvements in glare shields, and its objects are as follows:

First, to provide a glare shield which has an opaque (or substantially so) bridge piece in an overshadowing or shading position across and above the eye openings so as to aid the driver in controlling light glare, as it affects him, to a fine degree.

Second, to combine an opaque bridge piece with a transparent, colored goggle plate, the adjacent edges of the bridge piece and plate being offset so as to expose only a narrow strip of the plate through which to look in order to diminish the glare when not too severe, the bridge piece being brought across the line of vision by a further drop of the head when the glare becomes dangerously strong.

Third, to provide a glare shield which has a forehead pad and a so-called nose balancer, these two parts coacting in maintaining the position of the shield with a high degree of comfort to the wearer, and being of especial value to wearers of eye glasses inasmuch as they space the goggle plate from the wearer's face in front of his eye glasses and prevent the elastic cord from pressing the glare shield against the eye glasses.

Fourth, to provide a glare shield particularly adapted to persons who are compelled to wear eye glasses while driving, the structure of the shield being such that its application to the driver's head will not press his glasses against his eyes.

Fifth, to provide the opaque bridge piece as a separate element so that it can be applied to the visor of an eye shade or the like in order to enable the progressive stopping of the glare.

Other objects and advantages will appear in the following specification, reference being had to the accompanying drawing in which;

Figure 1 is a perspective view illustrating the general aspects of the improved glare shield.

Figure 2 is a cross section taken on the line 2—2 of Figure 1, but illustrating the glare shield structure as unmounted upon the face of the wearer.

Figure 3 is a side elevation especially illustrating how the forehead and nose balancer space the goggle plate from the eye glasses of the wearer.

Figure 4 is a rear elevation of the glare shield.

Figure 5 is a detail perspective view of the goggle plate and its rim trimmings.

Figure 6 is a perspective view of an ordinary eye shade, illustrating the application of the opaque bridge piece.

The instant invention is an improvement on the glare shield of Joseph L. Peavey, disclosed in an application for patent filed September 6, 1933, Serial No. 688,371 which has since eventuated in Patent No. 1,985,668 of December 25, 1934. So much of the structure as is common to the two glare shields is briefly described as follows: The glare shield generally designated 1, comprises right and left sides 2, 3, corresponding with the right and left eyes of the wearer. A part 4 connects the two sides and leaves a nose opening 5, the two sides 2, 3 and the part 4 being formed, preferably, from a single piece of transparent, green (or other desired color) celluloid, (or equivalent material) herein known as the goggle plate 6.

This plate has eye openings 7, 8 in the respective sides 2, 3. From this point on the structure of the instant goggle plate is different from that in the patent, the one remaining feature of common identity being an elastic cord 9 by which the glare shield is held in place. The ends of this cord are suitably attached to soft leather couplings 10 which are turnably riveted at 11 to the glare shield as shown.

Reverting to the goggle plate 6 (Fig. 5), the top edges 12 of the eye openings 7, 8 are formed on a slant which, from the viewpoint of the wearer is upwards from left to right. This arrangement emplaces more of the colored material of the goggle plate in the line of vision at the left side of the driver, and leaves practically a full and clear eye opening on the side nearest the right of the road. The top edges 12 are parallel, and the two eye openings are of identical shape and size. U-shaped trimmings 13, secured to the rims of the openings 7, 8 as at 14, not only serve as trimmings but reinforce the rims as well and, further, act as spacers as presently appears.

A so-called nose balancer 15 is attached to the part 4 of the goggle plate 6. Its showing is omitted in Figure 5. It comprises a strip 16 of celluloid. Its free end has a cork or equivalent pad 17 which is secured thereto at 18 in position to contact the bridge of the wearer's nose. The strip 16 is herein disclosed as being attached to the part 4 by means of a rivet 19 (Fig. 2), but the strip may be made integral with the part 4 in any way that will insure its flexibility. To that end the strip 16 can be formed as an integral depending tongue extending from the part 4 into the nose opening 5, and it is believed that this construction can be visualized so readily as not to require specific illustration.

An opaque (or substantially so) bridge piece 20 is secured to the front of the transparent goggle plate 6 by the same tubular rivets 11 which hold the couplings 10. These rivets go through a backing strip 21 (Fig. 4), the purpose of this strip being to strengthen the glare shield transversely to that degree which will ordinarily prevent the elastic cord 9 from bending it into arc form and undesirably pressing the shield against the eye glasses 22 of the wearer. Whether or not the backing strip 21 is used in practice, the glare shield is intended to be sufficiently strong in the transverse direction to resist an objectionable degree of bending under tension of the cord 9.

The bridge piece 20 is ordinarily made of celluloid, but as to this any desired opaque equivalent can be used. That edge 23 which comes over the eye opening 7 (Fig. 1) is straight across, while the other edge 24 which comes over the eye opening 8 is made on a slant the same as the edge 12. Both edges 23, 24, whether the edge 23 is straight or not are offset from the edges 12 so as to expose only narrow strips 25 of the goggle plate 6 through which the wearer will look by tilting his head forwardly a little in order to diminish the glare of lights ahead. Should the glare reach dangerous proportions he will tilt his head forward a little farther so as to bring the edges 23, 24 down upon the glare, so to speak, and diminish it even more.

A center lip 26, centrally pendent from the bridge piece 20, assumes a restricting position with respect to the nose balancer 15, keeping the flexibility of the latter in check so that it will not tend to yield too freely when the glare shield is emplaced as in Figure 1. The center lip may have an initial flare as illustrated in Figures 1, 2 and 3 so as to afford the nose balancer unrestrained flexibility within the space designated 27 (Fig. 2). But whether or not the center lip will be flared is a matter of choice in manufacture.

At this point the spacing function of the trimmings 13 will become apparent. Their free ends 28 (Fig. 5) extend well toward the top edge of the goggle plate 6. The strip 16 of the nose balancer is situated between the upright members of the adjacent trimmings. The outer surfaces of the trimmings and the nose balancer strip are, therefore, on a common level. This enables the application of the bridge piece 20 on a well distributed support, the nose balancer strip being situated in the center space provided by the goggle plate on back, the bridge piece 20 on front, and the adjacent members of the trimmings 13 on the sides.

In the event that the strip 16 is made solid with the goggle plate, for example by slitting the part 4 and making the strip depend into the nose opening 5, there would not be any need for spacers, and in that case the trimmings 13 can be left off. It would be regarded as a mere matter of selection to then make the goggle plate a little thicker than shown.

A forehead pad 29 is attached on back of the glare shield in any desired way, for example by pins 30 which go through a guard plate 31 on front. The pad 29 is preferably made of cork, although it, like the pad 17, can be made of some other material such as felt. The pad 29 is covered on the exposed side with rubberized cloth 32. One of the outstanding advantages of the pad 29 is its function of spacing the goggle plate 6 away from the face of the wearer (Fig. 3) so that the tension of the elastic cord 9 will not press the glare shield against the eye glasses 22, and in turn press the eye glasses against the eyes of the wearer.

Another outstanding feature of the instant glare shield is the opaque bridge piece 20. It is intended to make this as a separate element without regard to its being combined in a glare shield of the type shown in Figure 1. When thus disassociated from the glare shield it becomes capable of embodiment in the transparent celluloid visor of some types of hats, caps and eye shades familiar to almost everyone. Figure 6 illustrates one such embodiment. Here the eye shade 33 includes a transparent, colored celluloid visor 34 across which the opaque bridge piece 20a is secured both at the ends as at 35 and by means of a set of center rivets 36 which go through the visor and into a backing pad 37.

The right and left edges 38 and 39 (equivalent to 23, 24, Fig. 1) are, respectively, straight and on a slant, the object being to afford the same glare control as is afforded by the arrangement in Figure 1, there being the same combination of an opaque covering bridge piece, with a transparent, colored substance beneath the lower edge, the use of the two enabling a progressive diminution and cutting out of the glare from lights ahead.

The operation is readily understood. When the glare shield in Figure 1 is applied to the wearer's head the tension of the elastic cord 9 naturally presses the pad 29 against his forehead. Since this pad stands out from the back of the goggle plate 6 it follows that the plate is spaced away from the face of the wearer. The nose balancer 15 will be adjusted to the most comfortable position, and the two pads working together make it possible to apply the glare shield in an evenly balanced and comfortable position.

The spacing away of the goggle plate has several advantages, to wit, the space provides for an ample circulation of air so that the wearer will not be uncomfortably heated about the eyes. The spacing feature makes the glare shield especially adaptable to persons wearing eye glasses. The glare shield will not be pressed against the eye glasses, nor the eye glasses against the eyes of the wearer and therefore smeared.

Ordinarily the driver will look through the clear eye openings 7, 8. Should he approach glaring lights, for example the lights of oncoming head lamps or the light of the sun, he needs only to tilt his head forwardly a little, and perhaps a little to the left, in order to bring the narrow strips 25 across the line of vision. Should these strips prove insufficient to cut out the glare to a comfortable degree he has only to tilt his head a little more in order to bring the edges 23, 24 across the line of glare. It is merely a matter of adjusting the position of the head first diminishing the glare and then cutting it out entirely, in order to progressively control the glare as it affects the eyes of the wearer of the glare shield. The identical functions just described obtain in the structure and use of a glare shield of the type in Figure 6, whether this be an eye shield as shown, or some other similar type of visor. The wearer of the eye shade can control the glare in the same manner as pointed out.

I claim:—

1. A glare shield comprising a goggle plate of transparent colored material, said plate having right and left sides with eye openings, and an opaque bridge piece attached to the goggle plate, said bridge piece having its bottom edges offset above and forwardly from the top edges of the eye openings so as to expose narrow strips of the plate across the clear parts of said openings.

2. A glare shield comprising a goggle plate having connected right and left sides with eye openings, an opaque bridge piece superposed on the goggle plate, an elastic cord and couplings by which its ends are attached to the goggle plate and respective sides, a forehead pad adapted to be pressed against the forehead of a wearer by tension of the cord, said pad spacing the sides from the eyes of the wearer, a flexible nose balancer centralized with respect to said sides and contactable with the bridge of the wearer's nose, and a center lip centrally pendent from said bridge piece in a restricting position with respect to the nose balancer, said lip being flared to provide a space for initially unrestrained flexing of the nose balancer.

3. A glare shield comprising a goggle plate of transparent colored material having connected right and left sides with eye openings, an elastic cord and couplings for its ends, the tension of the cord being adapted to press the pad against the forehead of the wearer, an opaque bridge piece across the top of the plate, said bridge piece having its bottom edges offset above and forwardly from the top edges of the eye openings so as to expose narrow strips of the goggle plate, a backing strip situated transversely of the goggle plate, means to simultaneously connect the bridge piece, goggle plate, couplings and backing strip, and a forehead pad on the back of said strip and bridge piece.

4. A glare shield comprising a goggle plate of transparent colored material having right and left eye openings and a nose opening, an elastic cord and couplings for its ends, a forehead pad adapted to be pressed into contact with the forehead of the wearer by the elasticity of the cord, a nose balancer comprising a flexible strip which has a pad to engage the wearer's nose bridge, said strip being centrally carried by the plate in line with the nose opening, a bridge piece having a center lip in a restricting position with respect to said strip, and means to simultaneously secure the bridge piece, couplings and goggle plate together.

5. A glare shield comprising a goggle plate of transparent colored material having right and left eye openings and a nose opening, trimming members attached to the rims of the openings and including side portions extending toward the top of the goggle plate, a nose balancer including a strip and a pad, there being means to secure the strip to the plate between adjacent members of the trimmings and in a centralized position in the nose opening, an opaque bridge piece across the top of the plate superimposed on portions of the trimmings and on a part of the strip, a forehead pad on back of the goggle plate, an elastic cord to press the forehead pad against the forehead of the wearer, couplings for the ends of the cord, and means to simultaneously secure the couplings, goggle plate and bridge piece.

6. In a glare shield, a goggle plate of transparent colored material having a central nose opening cut in from one longitudinal edge, and a pair of eye openings, the top edges of said openings being formed on identical slants, and a bridge piece of opaque material superposed on said goggle plate across the top of eye openings and away from the slanting edges so as to expose some of the goggle plate, a bottom edge portion of said bridge piece over one eye opening being straight across, another edge portion over the other eye opening being on a slant.

JOSEPH L. PEAVEY.